United States Patent
Knight et al.

(10) Patent No.: US 12,427,584 B2
(45) Date of Patent: Sep. 30, 2025

(54) ROTARY TOOL WITH AXIAL ADJUSTMENT MECHANISM

(71) Applicant: TECHTRONIC CORDLESS GP, Anderson, SC (US)

(72) Inventors: Tyler H. Knight, Greenville, SC (US); Edward A. Pomeroy, Piedmont, SC (US); Elton L. Watson, Greenville, SC (US)

(73) Assignee: Techtronic Cordless GP, Anderson, SC (US)

( * ) Notice: Subject to any disclaimer, the term of this patent is extended or adjusted under 35 U.S.C. 154(b) by 881 days.

(21) Appl. No.: 17/533,252

(22) Filed: Nov. 23, 2021

(65) Prior Publication Data

US 2022/0168870 A1    Jun. 2, 2022

Related U.S. Application Data

(60) Provisional application No. 63/119,307, filed on Nov. 30, 2020.

(51) Int. Cl.
*B23B 31/02*    (2006.01)
*B25F 5/00*    (2006.01)

(52) U.S. Cl.
CPC .............. *B23B 31/028* (2013.01); *B25F 5/00* (2013.01); *Y10T 279/3487* (2015.01)

(58) Field of Classification Search
CPC ..... B23B 31/028; B25F 5/00; Y10T 279/3487
See application file for complete search history.

(56) References Cited

U.S. PATENT DOCUMENTS

| | | | | |
|---|---|---|---|---|
| 928,700 | A | * | 7/1909 | Reynolds ............ B23B 31/028 279/156 |
| 2,118,485 | A | | 5/1938 | Russell |
| 2,182,411 | A | * | 12/1939 | Rosenberg ........... B23B 31/028 279/156 |
| 2,940,488 | A | | 6/1960 | Riley, Jr. |
| 4,592,257 | A | | 6/1986 | Durr |
| 4,630,512 | A | | 12/1986 | Durr |

(Continued)

FOREIGN PATENT DOCUMENTS

| | | |
|---|---|---|
| CA | 2496073 A1 | 8/2006 |
| DE | 870931 C  * | 3/1953 |

(Continued)

OTHER PUBLICATIONS

Extended European Search Report for Application No. 21210611.6 dated Nov. 14, 2022 (9 pages).

*Primary Examiner* — Eric A. Gates
(74) *Attorney, Agent, or Firm* — Michael Best & Friedrich LLP

(57) ABSTRACT

A rotary tool including a tool body defining an axis extending between a rear end and an opposite working end, a motor configured to receive power from a power source, a drive shaft coupled to the motor with the motor, a chuck coupled to the drive shaft, and an axial adjustment mechanism. The axial adjustment mechanism includes an adjustment shaft having an axial end defining a floor of the chuck, where the floor limits an insertion depth within the chuck, and where the adjustment shaft is movable in a direction parallel to the axis between a first position defining a first insertion depth and a second position defining a second insertion depth.

17 Claims, 6 Drawing Sheets

(56) References Cited

U.S. PATENT DOCUMENTS

| | | | |
|---|---|---|---|
| 4,647,260 A | 3/1987 | O'Hara et al. | |
| 4,947,714 A | 8/1990 | Fluri | |
| 5,025,903 A | 6/1991 | Elligson | |
| 5,044,233 A | 9/1991 | Tatsu et al. | |
| 5,137,289 A * | 8/1992 | Butikofer | B23B 31/028 279/156 |
| 5,301,962 A * | 4/1994 | Killinger | B23B 31/208 279/156 |
| 5,341,704 A | 8/1994 | Klemm | |
| 5,380,132 A | 1/1995 | Parks | |
| 5,524,512 A | 6/1996 | Wolfe | |
| 5,601,387 A | 2/1997 | Sanford et al. | |
| 6,109,149 A | 8/2000 | Neumaier | |
| 6,543,971 B2 | 4/2003 | Mawhinney | |
| 6,547,013 B2 | 4/2003 | Riedl et al. | |
| 7,192,228 B2 | 3/2007 | Haenle et al. | |
| 7,243,922 B2 | 7/2007 | Gibbons | |
| 7,337,697 B2 | 3/2008 | Bader et al. | |
| 7,735,400 B2 | 6/2010 | Chen | |
| 7,810,414 B2 | 10/2010 | Hsu | |
| 7,823,483 B2 | 11/2010 | Yamada | |
| 8,302,513 B2 | 11/2012 | Evatt | |
| 8,327,551 B2 | 12/2012 | Wasielewski et al. | |
| D678,369 S | 3/2013 | Santamarina | |
| D687,872 S | 8/2013 | Santamarina | |
| 8,662,801 B2 | 3/2014 | Santamarina et al. | |
| 8,721,234 B2 | 5/2014 | Santamarina et al. | |
| 8,740,513 B2 | 6/2014 | Santamarina et al. | |
| 8,821,085 B2 | 9/2014 | Haimer et al. | |
| 9,028,181 B2 * | 5/2015 | Herud | B23B 31/305 279/20 |
| 9,205,497 B2 | 12/2015 | Harrison et al. | |
| 9,505,063 B2 | 11/2016 | Santamarina et al. | |
| 9,555,478 B2 | 1/2017 | Matheis | |
| 9,566,695 B2 | 2/2017 | Rajotte | |
| 9,597,785 B1 | 3/2017 | Gertner | |
| 10,695,896 B2 | 6/2020 | Ikuta | |
| 10,821,579 B2 | 11/2020 | Rajotte et al. | |
| 2005/0200087 A1 | 9/2005 | Vasudeva et al. | |
| 2007/0059117 A1 | 3/2007 | Haimer et al. | |
| 2008/0185793 A1 | 8/2008 | Haimer et al. | |

FOREIGN PATENT DOCUMENTS

| | | | |
|---|---|---|---|
| DE | 2345050 A1 | 3/1975 | |
| DE | 2549153 A1 | 5/1977 | |
| DE | 8306580 U1 | 4/1987 | |
| DE | 3308135 C2 | 10/1987 | |
| DE | 202014103512 U1 | 7/2015 | |
| EP | 1688222 A1 | 8/2006 | |
| EP | 2363246 A2 | 9/2011 | |
| EP | 1941973 B2 | 1/2016 | |
| EP | 3231559 B1 | 5/2019 | |
| GB | 560507 A | 4/1944 | |
| GB | 2435002 B | 5/2008 | |
| WO | WO-2013026444 A2 * | 2/2013 | B23B 31/005 |
| WO | WO-2015136637 A1 * | 9/2015 | B23B 31/028 |
| WO | 2019030004 A1 | 2/2019 | |

\* cited by examiner

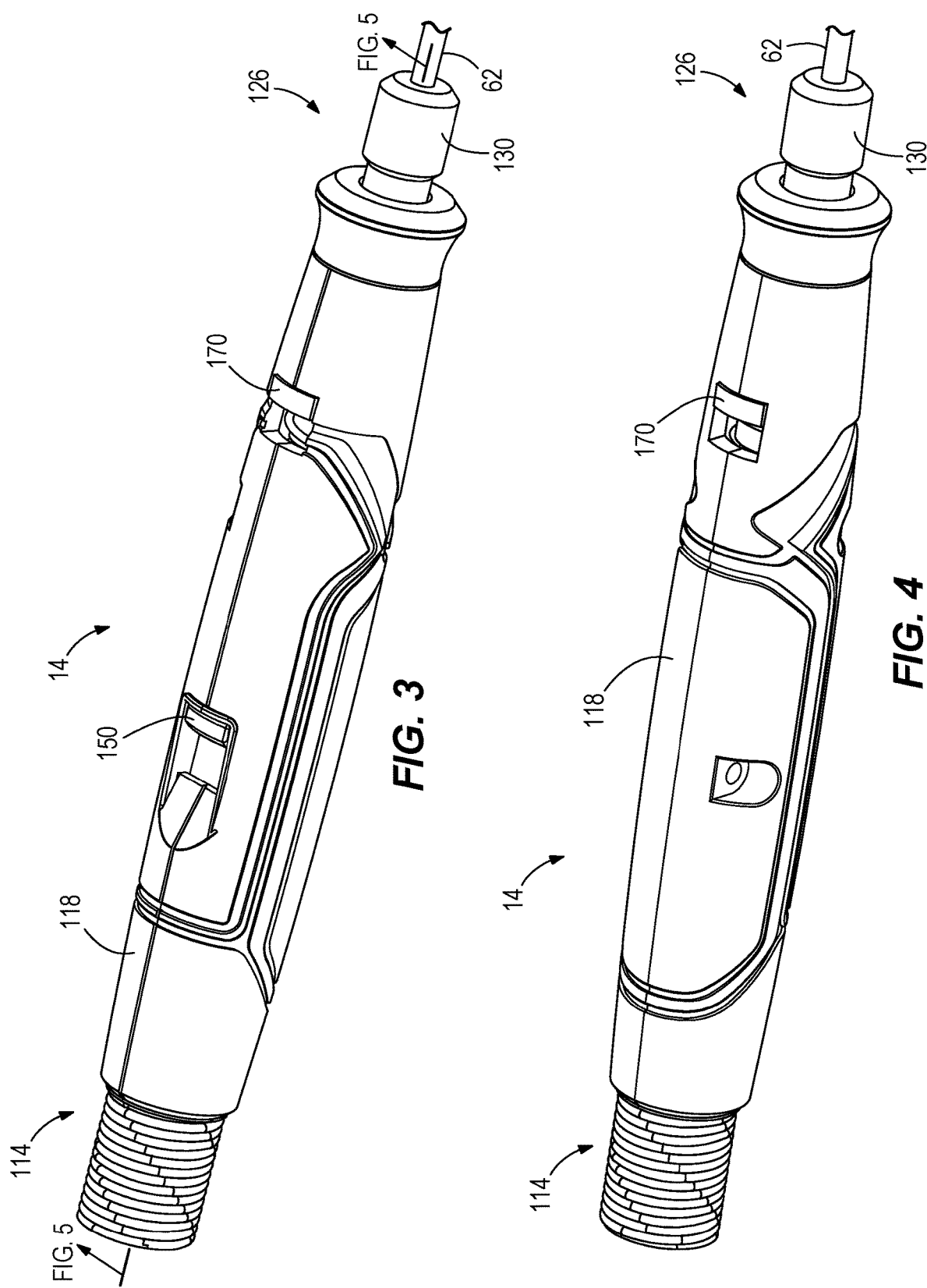

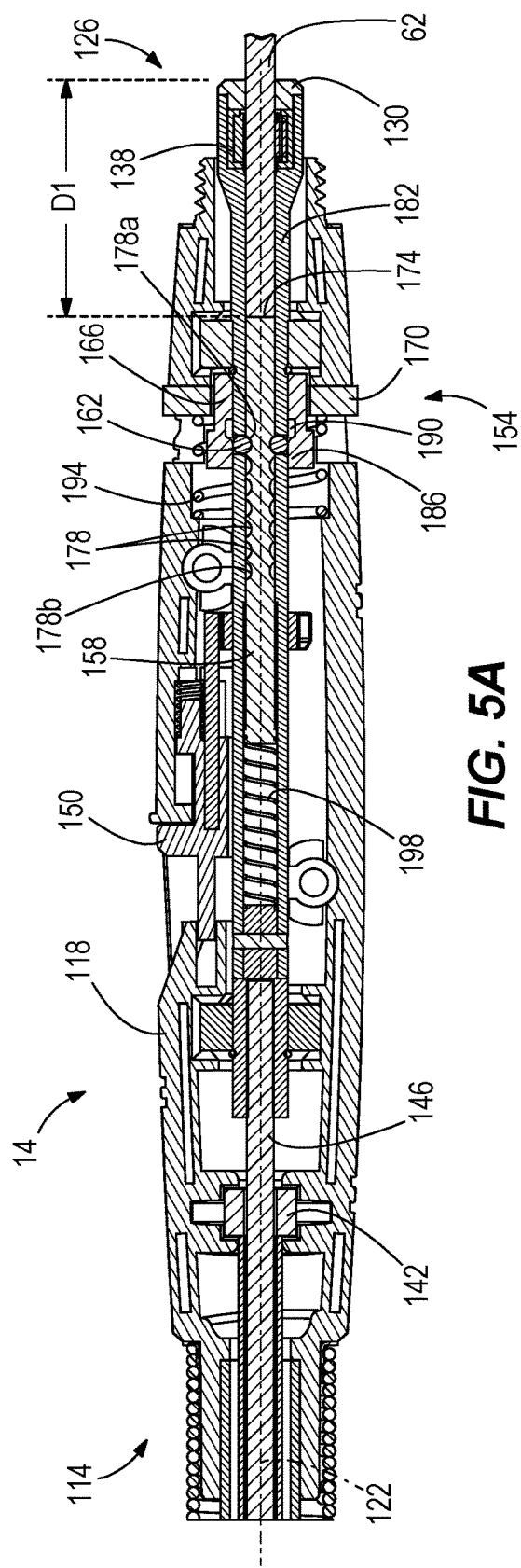
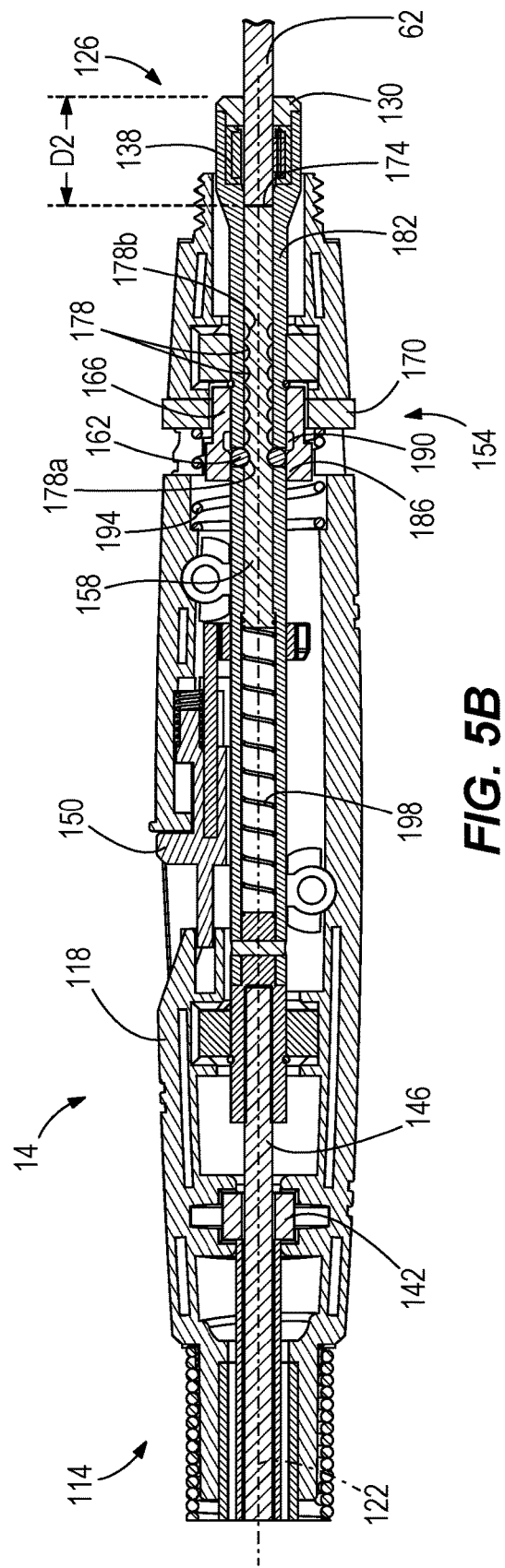
FIG. 5A
FIG. 5B

ROTARY TOOL WITH AXIAL ADJUSTMENT MECHANISM

CROSS-REFERENCE TO RELATED APPLICATIONS

The present application claims priority to U.S. Provisional Patent No. 63/119,307, filed Nov. 30, 2020, the entire contents of which is included by reference herein.

FIELD OF THE DISCLOSURE

The present disclosure relates to power tools, and in particular rotary power tools.

BACKGROUND OF THE DISCLOSURE

Rotary tools transmit a rotational force to a tool accessory, which ultimately performs work on an item. Rotary tools can be used for engraving, polishing, sanding, cutting, and the like.

SUMMARY OF THE DISCLOSURE

The present disclosure provides, in one aspect, a rotary tool assembly including an axial adjustment mechanism, which enables the rotary tool to receive a tool accessory at a variety of insertion depths.

The present disclosure provides, in another aspect, a rotary tool including a tool body defining an axis extending between a rear end and an opposite working end, a motor configured to receive power from a power source, a drive shaft coupled to the motor with the motor, a chuck coupled to the drive shaft, and an axial adjustment mechanism. The axial adjustment mechanism includes an adjustment shaft having an axial end defining a floor of the chuck, where the floor limits an insertion depth within the chuck, and where the adjustment shaft is movable in a direction parallel to the axis between a first position defining a first insertion depth and a second position defining a second insertion depth.

The present disclosure provides, in another aspect, a rotary tool assembly including a base including a power receptacle operable to receive a power source, a power cord coupled to the power receptacle and configured to transfer power from the power source, and a rotary tool electrically coupled to the power cord. The rotary tool includes a body defining an axis extending between a rear end and an opposite working end, a motor configured to receive power from the power source via the power cord, a drive shaft coupled to the motor, a chuck coupled to the drive shaft, and an axial adjustment mechanism. The axial adjustment mechanism includes an adjustment shaft having an axial end defining a floor of the chuck, where the floor limits an insertion depth within the chuck, and where the adjustment shaft is movable between a first position defining a first insertion depth and a second position defining a second insertion depth.

The present disclosure provides, in yet another aspect, a rotary tool including a tool body defining an axis extending between a rear end and an opposite working end, a motor configured to receive power from a power source, a drive shaft coupled to the motor, a chuck coupled to the drive shaft, the chuck being positioned adjacent the working end, and an axial adjustment mechanism. The axial adjustment mechanism includes an adjustment shaft having an axial end defining a floor of the chuck, where the floor limits an insertion depth within the chuck, and where the adjustment shaft is axially movable between a plurality of axial positions, each of the plurality of axial positions corresponding to an insertion depth. A locking member is selectively engagable with the adjustment shaft to lock the adjustment shaft in the plurality of axial positions, the locking member biased towards a locked position. An actuator extends externally of the tool body, where the actuator is actuable to release the locking member from the locked position.

Other aspects of the invention will become apparent by consideration of the detailed description and accompanying drawings.

BRIEF DESCRIPTION OF THE DRAWINGS

FIG. 3 is a first perspective view of a rotary tool of the rotary tool assembly of FIG. 1.

FIG. 4 is a second perspective view of the rotary tool of FIG. 3.

FIG. 5A a cross-sectional view of the rotary tool of FIG. 3 taken along section 5-5 in FIG. 3.

FIG. 5B is a cross-sectional view of the rotary tool of FIG. 3 taken along section 5-5 in FIG. 3.

DETAILED DESCRIPTION

Before any embodiments of the disclosure are explained in detail, it is to be understood that the disclosure is not limited in its application to the details of construction and the arrangement of components set forth in the following description or illustrated in the following drawings. Also, it is to be understood that the phraseology and terminology used herein is for the purpose of description and should not be regarded as limiting.

Figure 1:
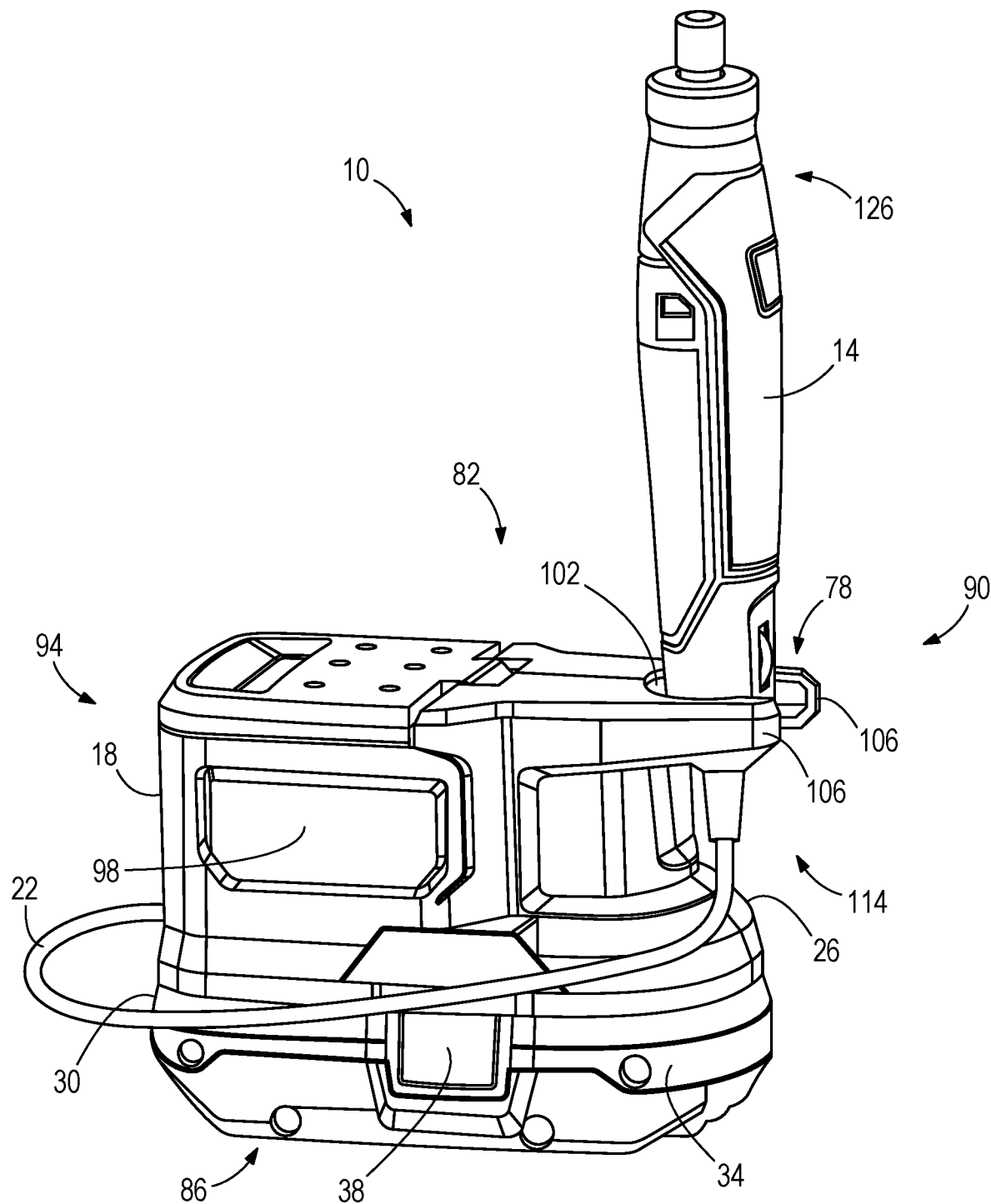
FIG. 1 is a perspective view of a rotary tool assembly.
Figure 2:
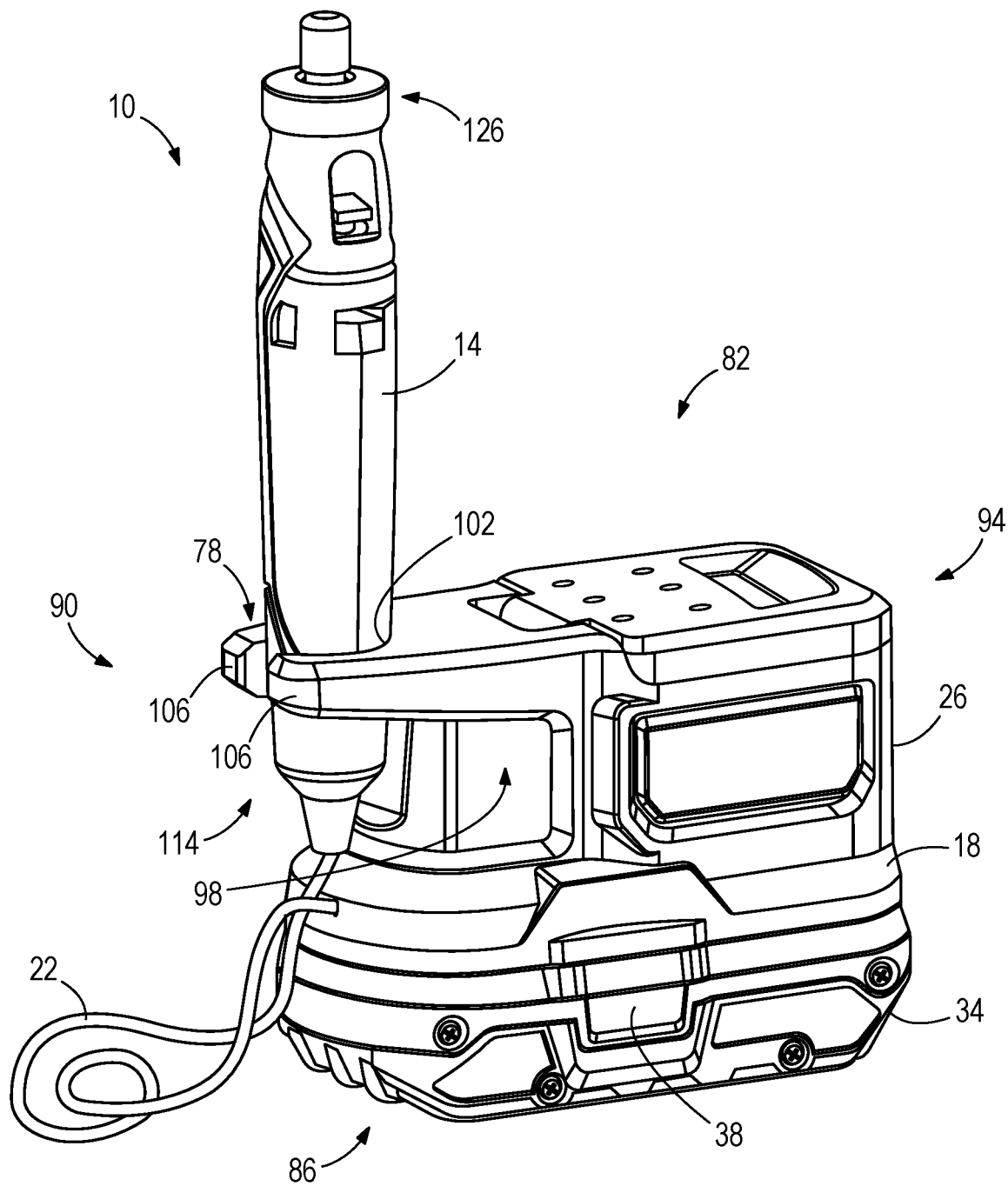
FIG. 2 is a reverse perspective view of the rotary tool assembly of FIG. 1.

FIGS. 1-2 illustrate a rotary tool assembly 10. The rotary tool assembly 10 includes a rotary tool 14 and a base 18 coupled together by a power cord 22. The base 18 provides power to the rotary tool 14 via the power cord 22 while enabling the rotary tool 14 to move relative to the base 18. Accordingly, because the rotary tool 14 does not include an on-board power source (e.g., a battery pack), the rotary tool 14 is more compact, allowing it to be used in more confined or tighter spaces.

The base 18 includes a generally rectangular housing 26 having a top end 82, a bottom end 86, a front end 90, a rear end 94, and two opposing sides 98. The base 18 includes a battery receptacle 30 at the bottom end 86 of the housing 26 for receiving a battery pack 34 to power the rotary tool 14. Specifically, when received within the battery receptacle 30, the battery pack 34 powers the rotary tool 14 via the power cord 22. The battery pack 34 can be removed from the housing 26 by pressing a release button 38 to disengage the battery pack 34.

In the illustrated embodiment, the battery pack 34 is inserted into the housing 26 from an opening on the bottom end 86 of the housing 26. When received within the battery receptacle 30, the battery pack 34 forms a foot of the base 18 to support the base 18 on a surface. Referring to FIGS. 1 and 2, in the illustrated embodiment, the battery pack 34 extends along the bottom end 86 of the housing 26.

The base 18 further includes a stand 78 configured to support the rotary tool 14 when the rotary tool 14 is not in use. The illustrated embodiment, the stand 78 extends from the front end 90 of the base 18 and includes a circular receptacle 102 for receiving the rotary tool 14. Specifically, the stand 78 includes two arms 106 extending from the front end 90 of the base 18 between which the circular receptacle 102 is defined, with which the rotary tool 14 is engageable to support the rotary tool 14 above a surface. The stand 78 includes a space 110 defined between the arms 106 and oriented transverse to the receptacle 102. In other words, the arms 106 do not touch one another, but rather, are separated to create a space 110 that allows the cord 22 to fit between the arms 106 when inserting the rotary tool 14 into the receptacle 102.

In other embodiments, the stand 78 may be positioned on the rear end 94 of the base 18, one of the sides 98, or the top end 82 of the base 18. Likewise, the stand 78 may have different sizes and/or shapes in order to accommodate rotary tools 14 of different sizes and/or shapes.

In some embodiments, the base 18 is connected to the rotary tool 14 by the power cord 22. In other embodiments, the rotary tool 14 may be connected to a power source which is on-board of the rotary tool 14. For example, the rotary tool 14 itself may be coupled to a battery. In the illustrated embodiment, the power cord 22 is coupled to the front end 90 of the base 18 and a rear end 114 of the rotary tool 14. The power cord 22 is flexible to allow the rotary tool 14 to move relative to the base 18. The power cord 22 may have different lengths to accommodate different types of rotary tools 14. As a non-limiting example, smaller rotary tools 14, such as engraving tools, may only need to reach a smaller area around the base 18 and thus, the power cord 22 may have a shorter length. Otherwise, larger rotary tools 14, such as die grinders or sanders, may include a longer power cord 22 to accommodate a larger working space for the rotary tool 14.

Referring to FIGS. 3-5, the illustrated rotary tool 14 includes a tapered cylindrical body 118 defining an axis 122. The body 118 is graspable by a user during use of the rotary tool 14. The rear end 114 of the rotary tool 14 is coupled to the power cord 22 and an opposite, front end of the rotary tool 14 functions as a working end 126 of the rotary tool 14. The working end 126 of the rotary tool 14 includes a chuck 130 for attaching different tool accessories 62 to the rotary tool 14. For example, the tool accessories 62 may include, as non-limiting examples, tool accessories 62, tools for sanding, engraving, cutting, grinding, and/or the like.

The stand 78 on the base 18 is sized and shaped to accommodate the size and shape of the rotary tool 14 and the power cord 22. As previously mentioned, the stand 78 includes a space 110 that is sufficiently wide to permit the power cord 22 to pass therethrough when inserting the rotary tool 14 into the receptacle 102. The inner diameter of the circular receptacle 102 is sized to be less than the largest outer diameter of the body 118 of the rotary tool 14 (e.g., proximate switch 150) in order to hold the rotary tool 14 above a surface without it sliding entirely through the receptacle 102. The inner diameter of the circular receptacle 102 is also greater than the smallest outer diameter of the body 118 (proximate the rear end 114) in order to permit the rotary tool to be lowered through 102 until reaching a mid-portion of the body where the outer diameter of the body 118 of the rotary tool 14 is nominally equal to the inner diameter of the circular receptacle 102.

With continued reference to FIGS. 3-5, the rotary tool 14 includes an electric motor 142 and drive shaft 146 driven by the motor 142. Alternatively, the motor 142 may be provided on the base 18, and the drive shaft 146 may be a flexible shaft configured to transfer torque from the base 18 to the rotary tool 14. The drive shaft 146 is coupled to the motor 142 and the a shaft 182 which is coupled to the chuck 130. The drive shaft 146 is configured to transfer torque from the motor 142 to the chuck 130 in response to activation of the motor 142. The motor 142 is selectively powered by the battery pack 34, which is disposed in the base 18 of the rotary tool assembly 10. In the illustrated embodiment, a power switch 150 (or an on/off switch) is disposed on the rotary tool 14 to selectively activate the motor 142 using power from the battery pack 34 that is transmitted through the power cord 22.

The chuck 130 is designed to receive a variety of different types and sizes of tool accessories 62. The chuck 130 may include a one way bearing 138, which allows insertion of the tool accessory 62 and limits removal of the tool accessory 62. Additionally, the chuck 130 may receive the tool accessory 62 at a plurality of different insertion depths in order to vary the degree to which the tool accessory 62 extends out of the chuck 130. In some embodiments, the rotary tool 14 includes a one way bearing as disclosed in U.S. Pat. No. 9,205,497, the entire contents of which is incorporated by reference herein.

In other embodiments, the rotary tool 14 may include a collet 63a-63e for receiving a tool accessory 62. The tool accessory 62 may be dimensioned to be received in one or a plurality of the collets 63a-63e. For example, the tool accessory 62b illustrated in FIG. 5B is dimensioned to engage the collet 63b. FIG. 6 provides various collets 63a-63e that may be received within the shaft 182. The illustrated shaft 182 is generally annular in shape. The shaft 182 is coupled to the chuck 130. The tool accessories 62 may then be received within the collets 63a-63e. The collets 63a-63e may be threaded to a threaded end of shaft 182 to apply a clamping force onto the collet 63a-63e, which in turn, clamps the tool accessory 62 to the shaft 182. FIG. 5A, however, shows a different chuck arrangement including a chuck 130. The chuck 130 is threaded to the threaded end of the shaft 182. However, in other embodiments, the chuck may be integral with the shaft 182. The chuck 130 may engage tool accessories 62 without the collets 63a-63e. The shaft 182 includes a one-way bearing like that disclosed in U.S. Pat. No. 9,205,497, which is incorporated by reference herein.

As shown in FIG. 5A, the rotary tool 14 includes an axial adjustment mechanism 154, which allows the rotary tool 14 to receive and retain a tool accessory 62 at any one of a variety of insertion depths. More specifically, the axial adjustment mechanism 154 may receive a tool accessory 62 at a first insertion depth D1 (FIG. 5A) and a second insertion depth D2 (FIG. 5B), which is different than the first insertion depth D1. When the tool accessory 62 is positioned at the first insertion depth D1, the tool accessory 62 extends further into the rotary tool 14 than when the tool accessory 62 is positioned at the second insertion depth D2.

In the illustrated embodiment, the axial adjustment mechanism 154 includes a detent shaft 158, a plurality of ball detents 162, a collar 166, and an actuator 170. The detent shaft 158 acts as an insertion depth stop to limit the degree to which the tool accessory 62 may be inserted into the chuck 130. More specifically, the detent shaft 158 extends towards the chuck 130 and defines a floor 174 of the receptacle of the chuck 130 receiving the tool accessory 62. Specifically, the axially forward end of the detent shaft 158 acts as the floor 174 of the chuck 130, which represents the maximum depth the tool accessory 62 may be inserted into the chuck 130. The detent shaft 158 is axially adjustable relative to the chuck 130 to allow the tool accessory 62 to be inserted at different insertion depths within the chuck 130. Specifically, the detent shaft 158 is axially adjustable so that the floor 174 of the chuck 130 can be moved relative to the working end 126 of the rotary tool 14 as described below.

Accordingly, user may adjust the axial position and, thus, the depth of the tool accessory 62 respective to the working end 126 by varying the location of the detent shaft 158. When the tool accessory 62 is inserted into the working end 126 a shallower depth, less of the tool accessory 62 is received within the chuck 130 than when the tool accessory 62 is inserted into the working end 126 a deeper depth. The detent shaft 158 may be locked in an axial position to maintain the tool accessory 62 at a desired insertion depth, or the detent shaft 158 may be unlocked to adjust the insertion depth.

The first insertion depth D1 is measured between the working end 126 of the rotary tool 14 and the floor 174 with the ball detents 162 being received in a first detent recess 178*a* of an adjustment shaft 158 (i.e., a detent shaft 158). The second insertion depth D2 is measured between the working end 126 of the rotary tool and the floor 174 with the ball detents 162 being received in a second detent recess 178*b* of the detent shaft 158. Both the first insertion depth D1 and the second insertion depth D2 are measured generally parallel to the axis 122. As illustrated in both FIGS. 5A and 5B, the detent shaft 158 includes a plurality of detent recesses 178 including both the first detent recess 178*a*, the second detent recess 178*b*, and other detent recesses 178. Accordingly, the detent shaft 158 may engage the ball detents 162 to locate the floor 172 at various positions relative to the working end 126.

Specifically, the detent shaft 158 includes a plurality of detent recesses 178, which are engageable by the ball detents 162 to maintain the detent shaft 158 at different axial positions. In some embodiments, the detent shaft 158 includes at least two detent recesses 178. In other embodiments, the detent shaft 158 includes at least four detent recesses 178. In yet another embodiment, the detent shaft 158 includes at least six detent recesses 178. Any number of detent recesses 178 are contemplated. The detent shaft 158 is slidable within the shaft 182, which concentrically surrounds the detent shaft 158. The collar 166 extends concentrically around the shaft 182. The ball detents 162 are positioned within through holes in the drive shaft 146 such that the ball detents 162 are engageable by the collar 166 from an exterior portion of the drive shaft 146 and are engageable with the detent shaft 158 at an interior portion of the drive shaft 146. The collar 166 generally aligns with the ball detents 162 and is slidable relative to the drive shaft 146 to move the ball detents 162 into or out of engagement with the detent shaft 158.

In some embodiments, the collar 166 includes a cam surface 186 that is configured to bias the ball detents 162 radially inward and into engagement with the detent recesses 178 of the detent shaft 158. When the ball detents 162 are engaged with the detent shaft 158, the detent shaft 158 is axially locked respective to the drive shaft and may not move axially relative to the drive shaft 146 and/or the chuck 130. The collar 166 further includes one or more cutouts, or pockets 190 for receiving the ball detents 162 when the ball detents 162 are moved radially outward to disengage the detent shaft 158.

In some embodiments, the collar 166 is movable from a first position (i.e., a locked position, shown in FIG. 5A) to a second position (i.e., a released position). When in the first position, the collar 166 biases the ball detents 162 radially inward into engagement with the detent shaft 158 to limit axial movement of the detent shaft 158, and thereby set the insertion depth of the tool accessory 62. When the collar 166 is in the second position, the pockets 190 are radially aligned with the ball detents 162, which are receivable within the pockets 190 after disengaging the detent shaft 158 so that the detent shaft 158 may be slidable to different axial positions to thereby adjust the insertion depth of the tool accessory 62.

Figure 5C:
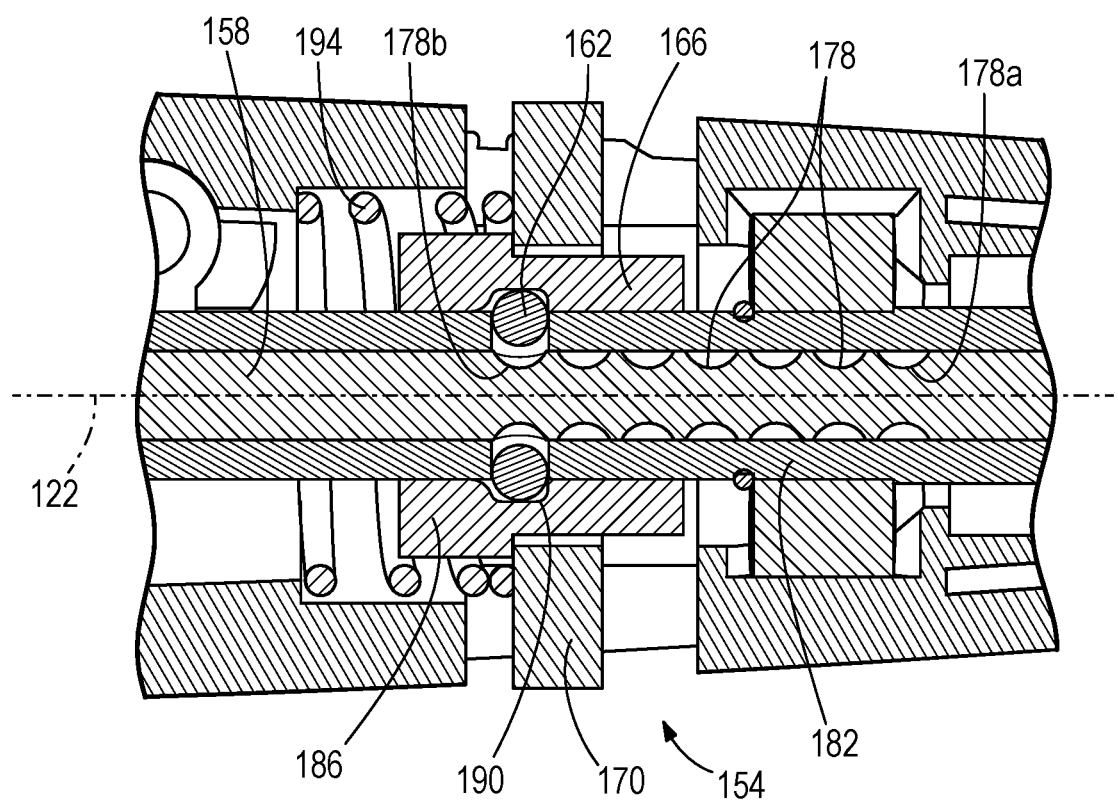
FIG. 5C is a cross-sectional view of the rotary tool of FIG. 3 taken along section line 5-5 in FIG. 3 with an adjustment shaft in an unlocked position.
Figure 6:
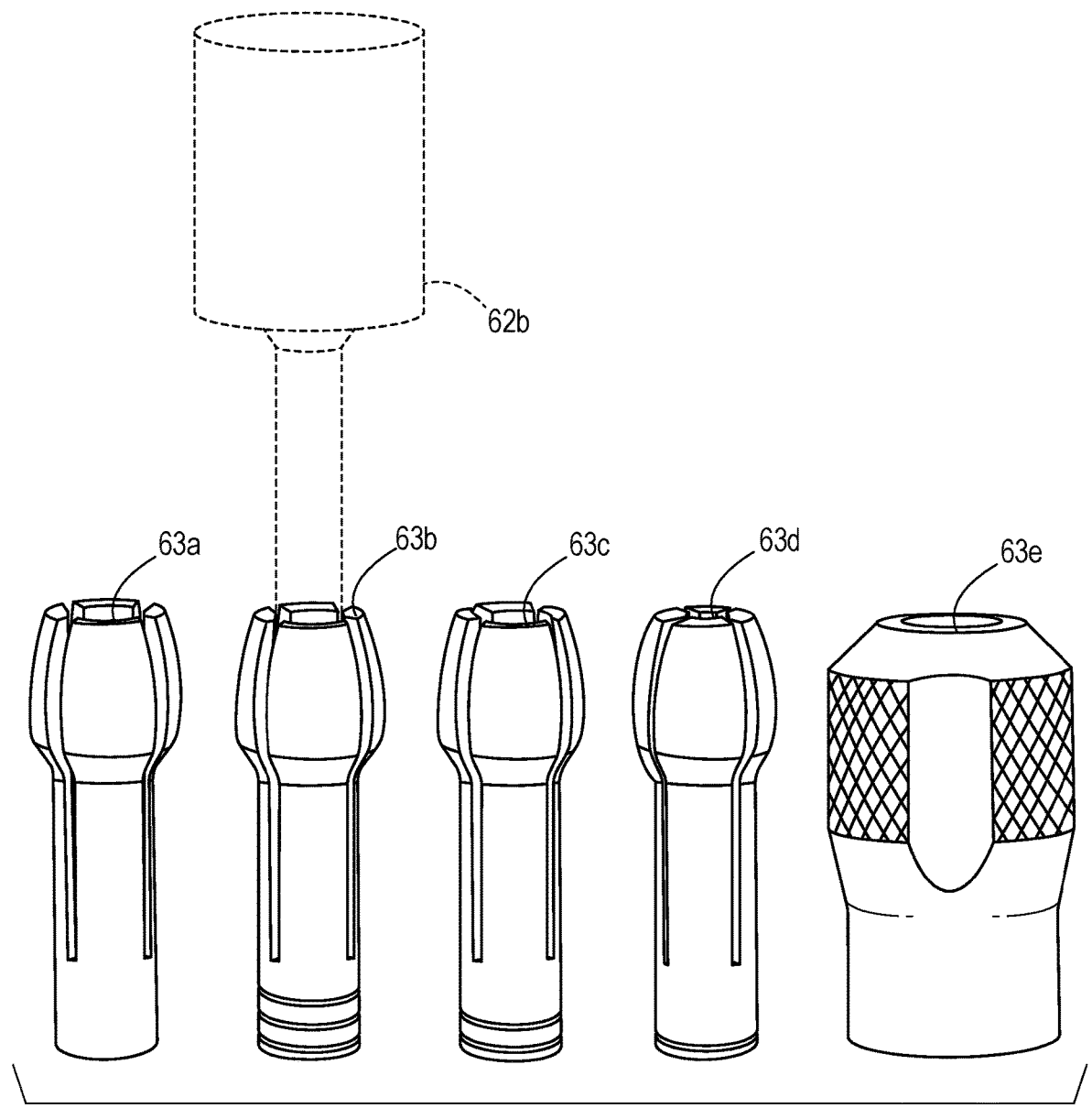
FIG. 6 illustrates a variety of collets for receiving tool accessories for use with the rotary tool of FIG. 3.

The actuator 170 may move the collar 166 from the locked position (FIGS. 5A, 5B) to the released position (FIG. 5C). The actuator 170 extends from an interior portion of the body 118 where it may engage the collar 166 to an exterior portion of the body 118 where a user may access the actuator 170. The collar 166 and the actuator 170 are biased towards the locked position such that the ball detents 162 are engaged with the detent shaft 158 in order to maintain the detent shaft 158 in a desired axial position. A biasing member (e.g., a compression spring 194) may bias one of both the collar 166 and the actuator 170 towards the locked position. A user may slide the actuator 170 against the biasing force towards the released position such that the ball detents 162 disengage the detent shaft 158, and thereby allow the detent shaft 158 to move axially.

In the illustrated embodiment, the detent shaft 158 is biased towards the chuck 130 by a biasing member, such as a compression spring 198. Thus, when the collar 166 is in the released position, the detent shaft 158 is biased towards a shallower insertion depth. The detent shaft 158 may be moved away from the chuck 130 to increase the insertion depth of the tool accessory 62 by overcoming the biasing force of the spring 198. Specifically, when a user wishes to adjust the insertion depth of the tool 14, the user may first move the actuator 170 and the collar 166 from the locked position (FIGS. 5A, 5B) to the released position (FIG. 5C) to unlock the detent shaft 158, permitting the spring 198 to rebound and push the detent shaft 158 forward within the drive shaft 146 toward the working end 126. Once the detent shaft 158 is unlocked, the user may insert a tool accessory 62 into the chuck 130 and push the tool accessory 62 against the detent shaft 158 to slide the detent shaft 158 axially against the biasing force of the spring 198. When the tool accessory 62 or collet 63*a*-63*e* is positioned at the desired insertion depth D1, D2, the user may release the actuator 170, which will return the collar 166 to the locked position (FIGS. 5A, 5B). Relative movement between the cam surface 186 on the collar 166 and ball detents 162 displaces the ball detents 162 in a radially inward direction and into one of the detent recesses 178 to maintain the detent shaft 158 at the desired insertion depth.

The axial adjustment mechanism 154 described herein may be used with other rotary tools or power tool that receive a tool accessory. For example, the axial adjustment mechanism 154 may be used with a drill, hammer drill, sander, and the like, which receive a tool accessory. The tool accessories may include a tool bit, cutting accessory, sanding accessory, and the like.

Although the invention has been described in detail with reference to certain preferred embodiments, variations and modifications exist within the scope and spirit of one or more independent aspects of the invention as described.

What is claimed is:
1. A rotary tool comprising:
   a tool body defining an axis extending between a rear end and an opposite working end;
   a motor configured to receive power from a power source;

a drive shaft coupled to the motor for co-rotation therewith upon operation of the motor;

a chuck coupled to the drive shaft for co-rotation therewith, the chuck being positioned adjacent the working end and being configured to engage a tool accessory; and an axial adjustment mechanism including an adjustment shaft having a plurality of detent recesses along its length, and an axial end defining a floor of the chuck, the floor limiting an insertion depth of the tool accessory when the tool accessory is received within the chuck, and a ball detent configured to selectively engage each of the plurality of detent recesses, wherein the adjustment shaft is movable in a direction parallel to the axis between a first position defining a first insertion depth and a second position defining a second insertion depth.

2. The rotary tool of claim 1, wherein the axial adjustment mechanism further includes a biasing member that biases the adjustment shaft towards the working end of the tool body.

3. The rotary tool of claim 2, wherein the biasing member is a compression spring, the compression spring positioned at an axially rear end of the adjustment shaft opposite the floor.

4. The rotary tool of claim 1, wherein the adjustment shaft is configured to be selectively locked in at least one of the first position and the second position.

5. The rotary tool of claim 4, wherein the adjustment mechanism further includes an actuator that is engagable by a user to unlock the adjustment shaft.

6. The rotary tool of claim 5, wherein the adjustment mechanism further includes a collar engagable with the ball detent, the collar movable between a first position and a second position, wherein, when in the first position the collar biases the ball detent radially inward into engagement with one of the plurality of detent recesses, and wherein, when in the second position the collar releases the ball detent from the plurality of detent recesses.

7. The rotary tool of claim 6, wherein the actuator and the collar are axially slidable together between a locked and an unlocked position, and wherein the adjustment mechanism further includes a second biasing member configured to bias the actuator and the collar towards the locked position.

8. The rotary tool of claim 1, wherein the adjustment shaft is movable to at least four different positions corresponding to four different insertion depths.

9. A rotary tool assembly comprising:

a base including a power receptacle operable to receive a power source;

a power cord electrically coupled to the power receptacle and configured to transfer power from the power source; and a rotary tool electrically coupled to the power cord, the rotary tool including a body defining an axis extending between a rear end and an opposite working end, a motor configured to receive power from the power source via the power cord, a drive shaft coupled to the motor for co-rotation therewith upon operation of the motor, a chuck coupled to the drive shaft for co-rotation therewith, the chuck being positioned adjacent the working end and being configured to engage a tool accessory, an axial adjustment mechanism including an adjustment shaft having a plurality of detent recesses along its length and an axial end defining a floor of the chuck, the floor limiting an insertion depth of the tool accessory when the tool accessory is received within the chuck, and and a ball detent is configured to selectively engage each of the plurality of detent recesses, wherein the adjustment shaft is movable between a first position defining a first insertion depth and a second position defining a second insertion depth.

10. The rotary tool assembly of claim 9, wherein the axial adjustment mechanism further includes a biasing member that biases the adjustment shaft towards the working end of the tool body.

11. The rotary tool assembly of claim 9, wherein the adjustment mechanism further includes a collar engagable with the ball detent, the collar movable between a first position and a second position, wherein, when in the first position the collar biases the ball detent radially inward into engagement with one of the plurality of detent recesses, and wherein, when in the second position the collar releases the ball detent from the plurality of detent recesses.

12. The rotary tool assembly of claim 11, wherein the axial adjustment mechanism further includes an actuator coupled to the collar, the actuator projecting radially outwardly from the axis to be operable from exterior to the tool body.

13. The rotary tool assembly of claim 9, wherein the adjustment shaft is movable to at least four different positions corresponding to four different insertion depths.

14. The rotary tool assembly of claim 9, wherein the adjustment shaft is movable in a direction parallel to the axis between the first position and the second position.

15. The rotary tool assembly of claim 9, wherein the base includes a stand configured to support the body of the rotary tool.

16. The rotary tool assembly of claim 15, wherein the stand includes arms projecting from the base, the arms defining a circular receptacle for receiving the rotary tool, and wherein the body of the rotary tool is a tapered cylinder configured to engage the circular receptacle.

17. The rotary tool assembly of claim 9, wherein the power source is a battery pack.

* * * * *